(12) United States Patent
Zhang (10) Patent No.: US 11,876,882 B2
(45) Date of Patent: Jan. 16, 2024

(54) METHOD AND SYSTEM FOR OPTOELECTRONIC MATCHING

(71) Applicant: Motorcomm Electronic Technology Co., Ltd., Jiangsu (CN)

(72) Inventor: Yanyan Zhang, Jiangsu (CN)

(73) Assignee: Motorcomm Electronic Technology Co., Ltd., Jiangsu (CN)

( * ) Notice: Subject to any disclaimer, the term of this patent is extended or adjusted under 35 U.S.C. 154(b) by 255 days.

(21) Appl. No.: 17/533,998

(22) Filed: Nov. 23, 2021

(65) Prior Publication Data
US 2023/0081127 A1    Mar. 16, 2023

(51) Int. Cl.
*H04L 69/24* (2022.01)
*H04B 10/27* (2013.01)
*H04L 69/323* (2022.01)

(52) U.S. Cl.
CPC .......... *H04L 69/24* (2013.01); *H04B 10/27* (2013.01); *H04L 69/323* (2013.01)

(58) Field of Classification Search
None
See application file for complete search history.

(56) References Cited

U.S. PATENT DOCUMENTS

| | | | | |
|---|---|---|---|---|
| 2004/0247313 | A1* | 12/2004 | Tanaka | H04L 12/4625 398/25 |
| 2010/0191525 | A1* | 7/2010 | Rabenko | H04L 12/2801 704/211 |
| 2013/0343761 | A1* | 12/2013 | Fang | H04B 10/271 398/115 |

FOREIGN PATENT DOCUMENTS

| | | | |
|---|---|---|---|
| CN | 101610116 A | 12/2009 | |
| CN | 113300770 A | 8/2021 | |
| CN | 113507349 A | 10/2021 | |
| JP | 2006135487 A * | 5/2006 | |
| JP | 2012070037 A * | 4/2012 | G06F 1/266 |

\* cited by examiner

*Primary Examiner* — Christopher M Crutchfield
(74) *Attorney, Agent, or Firm* — SoCal IP Law Group LLP; Mark A. Goldstein (57) ABSTRACT

A method and a system for optoelectronic matching are disclosed. The method comprises the steps of: S1, enabling an electrical port of a first optoelectronic device to auto-negotiate with a first electrical port to obtain the highest supported speed of the first electrical port, and enabling an electrical port of a second optoelectronic device to auto-negotiate with a second electrical port to obtain the highest supported speed of the second electrical port; S2, encapsulating, by an optical port of an optoelectronic device, a current speed and the negotiated highest supported speed of an opposite end in a transmission protocol, and sending the same to an optical port of another optoelectronic device; S3, obtaining a target speed based on the highest supported speed of the first electrical port and the highest supported speed of the second electrical port; S4, determining whether the current speed is equal to the target speed, respectively.

10 Claims, 4 Drawing Sheets

METHOD AND SYSTEM FOR OPTOELECTRONIC MATCHING

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from Chinese Patent Application No. 202111058720.X, filed Sep. 10, 2021 entitled, "METHOD AND SYSTEM FOR OPTOELECTRONIC MATCHING" the entirety of which is incorporated herein by reference.

BACKGROUND

The invention relates to the field of communication technologies, and more particularly, to a method and a system for optoelectronic matching.

DESCRIPTION OF THE RELATED ART

A Fiber Optical Transceiver (FOT) is an Ethernet transmission media conversion unit that exchanges short-distance twisted-pair electrical signals and long-distance optical signals. Generally, it is used in such network environment where Ethernet cables cannot cover and transmission distance must be extended by using optical fibers since it is greater than 100 meters. The Fiber Optical Transceiver is usually positioned an access layer application of broadband metropolitan area network (BMAN). With the rapid development of communication technologies, the speed of the network becomes increasingly faster, the application scope of the Fiber Optical Transceiver becomes wider, so the line rate of Ethernet needs to be higher, that is, the bandwidth becomes wider and wider, thus, network with rate of 10M bits/second or 100M bits/second used before can no longer be used as the connection between BMAN and the backbone network. Instead, a higher bandwidth network is needed to support it. In addition, the speed of the Ethernet optical fiber transceiver must be higher enough to support the rate of 10M bits/second, 100M bits/second, 1000M bits/second, 2.5 G bits/second.

The electrical port of the optoelectronic device can perform auto-negotiation to obtain the highest rate supported to an electrical port of the opposite end, that is, the Highest Common Denominator (HCD). However, the physical layer PHY cannot be negotiated in the optical transmission standard, the port speed of a PHY of the device could not be self-adaptively adjusted between two optical ports and between the optical port and the electrical port, so it is impossible to quickly establish a communication link between a first opposite end device and a second opposite end device.

In the prior art, a memory can be set in a TX direction and a RX direction, respectively, to absorb the transmission difference between the TX direction and the RX direction. However, the memory is usually large in size, so the cost increases, and test costs and test risks may also increase, and the device is relatively complex. The highest supported speed of the first opposite end device and the second opposite end device can be obtained via a microcontroller (MCU). Then chips of physical layers of the two opposite end devices are configured manually. Of note, it is inefficient in establishment of communication connection by using such a method. Thus, in order to solve the problem, it is urgent to design a method and a system for optoelectronic matching to meet the actual requirements.

SUMMARY

Given that the foregoing problems exist in the prior art, the present invention provides a method and a system for optoelectronic matching.

The technical problems can be solved by using the following technical solution:

a method for optoelectronic matching, comprising a first optoelectronic device and a second optoelectronic device, wherein the first optoelectronic device is connected to the second optoelectronic device via optical fibers, an electrical port of the first optoelectronic device is connected to a first electrical port of a first opposite end, an electrical port of the second optoelectronic device is connected to a second electrical port of a second opposite end;

the method comprises the steps of:

S1, enabling the electrical port of the first optoelectronic device to auto-negotiate with the first electrical port to obtain an highest supported speed of the first electrical port, and the first electrical port and the opposite end establishing a connection at a current speed of the first electrical port; and enabling an electrical port of the second optoelectronic device to auto-negotiate with the second electrical port to obtain an highest supported speed of the second electrical port, and the second electrical port and the opposite end establishing a connection at a current speed of the second electrical port;

S2, encapsulating, by an optical port of the first optoelectronic device, a current speed of the first optoelectronic device and the negotiated highest supported speed of the first electrical port in transmission parameters of a transmission protocol, and sending the same to an optical port of the second optoelectronic device; encapsulating, by an optical port of the second optoelectronic device, a current speed of the second optoelectronic device and the negotiated highest supported speed of the second electrical port in the transmission parameters of the transmission protocol, and sending the same to an optical port of the first optoelectronic device;

S3, obtaining, by the first optoelectronic device and the second optoelectronic device, a target speed based on the highest supported speed of the first electrical port and the highest supported speed of the second electrical port, respectively, wherein the target speed is the greatest common divisor of the highest supported speed of the first electrical port and the highest supported speed of the second electrical port;

S4, determining whether the current speed of the first optoelectronic device and the current speed of the second optoelectronic device are equal to the target speed, respectively;

if the current speeds are equal to the target speed, the current speeds are maintained;

if the current speeds are not equal to the target speed, proceed to S5;

S5, configuring, by the first optoelectronic device and the second optoelectronic device, the speeds of its electrical port and optical port to the target speed, respectively, and then the first optoelectronic device and the first electrical port negotiating automatically, and the second optoelectronic device and the second electrical port negotiating automatically, to establish a connection.

Preferably, the method further comprises:

forcing the NP (Next Page) domain in the local Base Page to 1, so that the local can negotiate the Next Page with the opposite end under any circumstances to get the highest supported rate of the opposite end;

S1 further comprises:

S11, sending the auto-negotiated Base Page configured with the NP domain to the corresponding opposite end;

S12, judging whether a physical layer of a local electrical port has a gigabit transmission capability;

if yes, send the auto-negotiated Next Page according to the auto-negotiation protocol;

if not, send an empty Next Page.

Preferably, when the highest supported speed of any one of the first opposite end and the second opposite end changes, the opposite end, of which the highest supported speed changes, sends an auto-negotiation request to an optoelectronic device to which it is correspondingly connected, and executes S1-S5.

Preferably, the transmission protocol is SGMII protocol, auto-negotiation is implemented between optical ports of the first optoelectronic device and the second optoelectronic device through the SGMII protocol.

Preferably, the first optoelectronic device and the second optoelectronic device comprise a physical layer and an SGMII layer, respectively, and the physical layer is connected to the SGMII Layer and the corresponding opposite end;

S2 further comprises:

outputting, by the physical layer, a trigger signal after receiving the highest supported speed of the negotiated corresponding opposite end;

receiving, by the SGMII layer, the trigger signal, and encapsulating the current speed and the highest supported speed of a corresponding opposite end into transmission parameters of the SGMII protocol;

performing auto-negotiation between the optical port of one of the first optoelectronic device and the second optoelectronic device and the optical port of the other of the first optoelectronic device and the second optoelectronic device through the SGMII protocol.

Preferably, S3 further comprises:

one of the first optoelectronic device and the second optoelectronic device receiving the transmission protocol sent by the optical port of the other optoelectronic device of the first optoelectronic device and the second optoelectronic device, to obtain the highest supported speed of the opposite end corresponding to the other optoelectronic device;

each of the first optoelectronic device and the second optoelectronic device performing the greatest common divisor processing on the highest supported speed of the opposite end of one optoelectronic device and the highest supported speed of the opposite end of the other optoelectronic device to obtain the target speed.

The invention further provides an optoelectronic matching system, comprising the above-mentioned optoelectronic matching method, the system comprising:

a first optoelectronic device, wherein an electrical port of the first optoelectronic device is connected to a first electrical port of a first opposite end;

a second optoelectronic device, wherein an electrical port of the second optoelectronic device is connected to a second electrical port of a second opposite end, and the first optoelectronic device and the second optoelectronic device are connected via optical fibers;

each of the first optoelectronic device and the second optoelectronic device comprises:

a first negotiation unit for auto-negotiation between an electrical port and a corresponding opposite end to obtain the highest supported speed of the opposite end corresponding to each of the optoelectronic devices;

a second negotiation unit, connected to the first negotiation unit, and configured to encapsulate the current speed and the highest supported speed of the opposite end into transmission parameters of a transmission protocol, and to send the current speed and the highest supported speed of the opposite end to an optical port of the other optoelectronic device.

A processing unit for obtaining a target speed based on the highest supported speed of an opposite end corresponding to one of the optoelectronic devices and the highest supported speed of an opposite end corresponding to the other optoelectronic devices in the transmission protocol;

a judging unit, connected to the processing unit, and configured to judge whether the current speed is equal to the target speed to obtain a judgment result;

a configuration unit, connected to the judgment unit and the first negotiation unit, respectively, and configured to configure the speed of the electrical port and the speed of the optical port to the target speed when the judgment result indicates that the current speed of a local electrical port is not equal to the target speed;

wherein the first negotiation unit is further configured to perform auto-negotiation with the corresponding opposite end after the speed is configured to the target speed.

Preferably, the first negotiation unit further comprises:

a judging module, configured to judge whether the physical layer of the local electrical port has the gigabit transmission capability when sending the auto-negotiated Base Page to a corresponding opposite port;

a negotiation message configuration module, connected to the judging module, and configured to configure auto-negotiated Next Page according to the auto-negotiation protocol when the physical layer of the local electrical port has gigabit transmission capability; and configured to configure an empty Next Page when the physical layer of the local electrical port does not have gigabit transmission capability; and a first negotiation module, connected to the negotiation message configuration module, and configured to send the configured auto-negotiated Next Page to a port of the corresponding opposite end.

Preferably, the transmission protocol is SGMII protocol, auto-negotiation between optical ports of the first optoelectronic device and the second optoelectronic device is achieved through the SGMII protocol.

Preferably, each of the first optoelectronic device and the second optoelectronic device comprises:

a physical layer, connected to an electrical end of a corresponding opposite end, and configured to output a trigger signal after receiving the highest supported speed of negotiated corresponding opposite end;

an SGMII layer, connected to the physical layer, and configured to receive the trigger signal, and configured to encapsulate the current speed and the highest supported speed of a corresponding opposite end into transmission parameters of the SGMII protocol, and to perform auto-negotiation between the optical port of one of the first optoelectronic device and the second optoelectronic device and the optical port of the other of the first optoelectronic device and the second optoelectronic device through the SGMII protocol.

By adopting the above-mentioned technical solutions, the present invention has the beneficial effects that a protocol is configured for an optical port of an optoelectronic device, so that the optical ports can also negotiate the speed therebetween. The highest supported speed of the opposite end to which a respective electrical port is connected is obtained through the auto-negotiation function of the electrical port. Then the highest supported speed of the respective opposite end connected to the optoelectronic device is sent to the other optoelectronic device through the negotiation of the optical port to which the protocol is configured. The two optoelectronic devices obtain a target speed based on the greatest common divisor of the highest supported speed of the opposite end through negotiation and the highest supported speed, which is transmitted via the protocol, of the opposite end to which the other optoelectronic device is connected. Connections between each of the optoelectronic devices and each of the respective opposite ends and between the two optoelectronic devices are established based on the target speed; through the auto-negotiation function, when the speed of any one of the ports changes, it can automatically trigger the negotiation function so that connections between each of the optoelectronic devices and each of the respective opposite ends and between the two optoelectronic devices can be successfully established.

DETAILED DESCRIPTION

The technical solution set forth in the embodiments of the present invention will now be described clearly and fully hereinafter with reference to the accompanying drawings of the embodiments of the present invention. Obviously, such embodiments provided in the present invention are only part of the embodiments instead of all embodiments. It should be understood that all the other embodiments obtained from the embodiments set forth in the present invention by one skilled in the art without any creative work fall within the scope of the present invention.

Notably, the embodiments set forth in the present invention and features of the embodiments may be combined in any suitable manner.

The present invention will be described hereinafter with reference to the accompanying drawings and particular embodiments, but the invention is not limited thereto.

The invention discloses a method and a system for optoelectronic matching, and it belongs to the field of communication technologies. It comprises a first optoelectronic device 2 and a second optoelectronic device 3, wherein the first optoelectronic device 2 is connected to the second optoelectronic device 3 via optical fibers, an electrical port of the first optoelectronic device 2 is connected to a first electrical port 11 of a first opposite end 1, an electrical port of the second optoelectronic device 3 is connected to a second electrical port 41 of a second opposite end 4, as shown in FIGS. 1-5.

Figure 1:
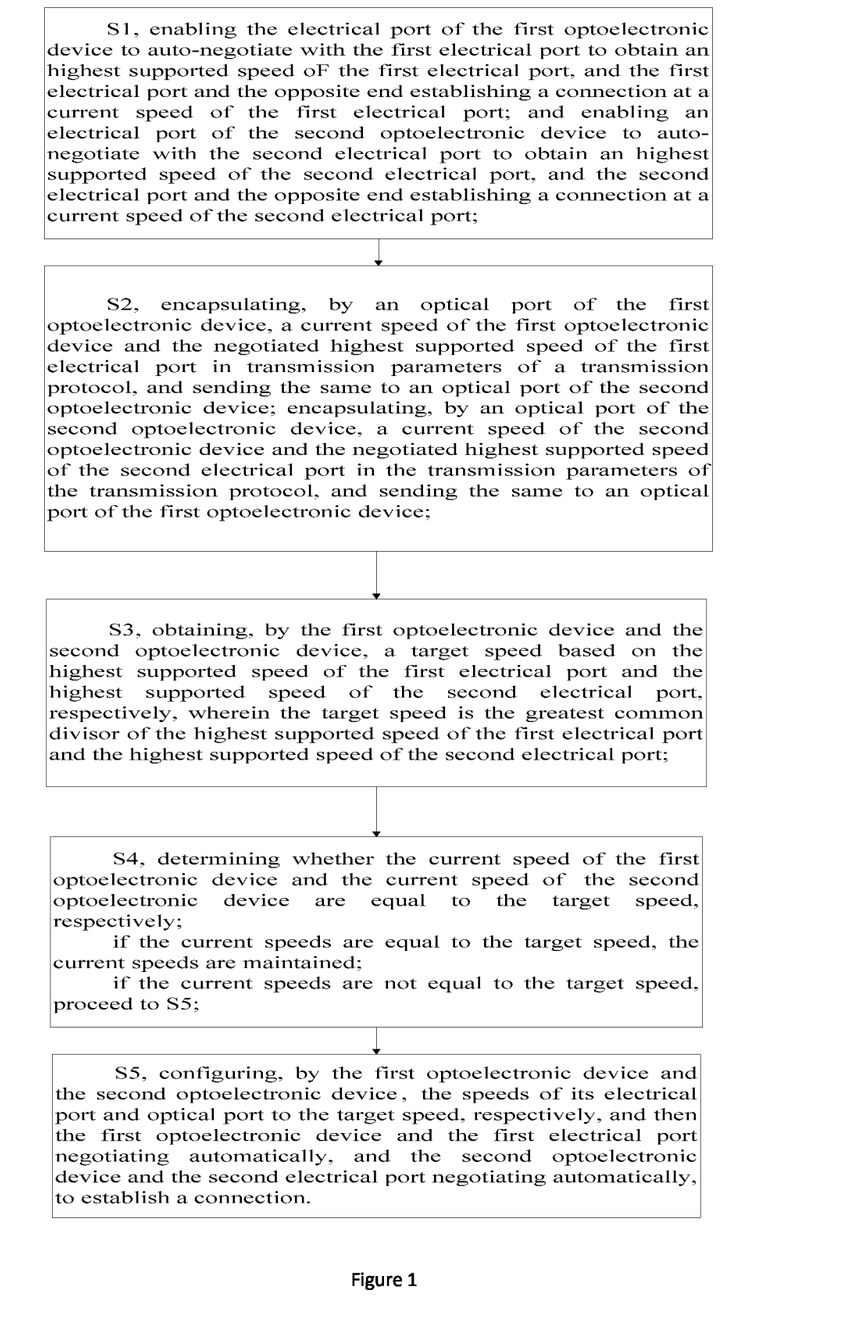
FIG. 1 is a flowchart of a method for optoelectronic matching.
Figure 2:
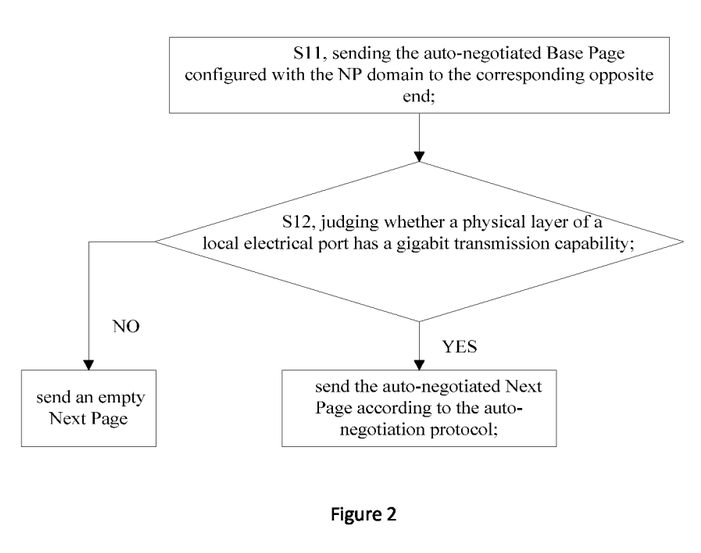
FIG. 2 is a flowchart of a specific embodiment of S4 according to the present invention.

As shown in FIG. 1, the method comprises the steps of:

S1, enabling the electrical port of the first optoelectronic device 2 to auto-negotiate with the first electrical port 11 to obtain an highest supported speed of the first electrical port 11, and the first electrical port and the opposite end establish a connection at a current speed of the first electrical port; and enabling an electrical port of the second optoelectronic device 3 to auto-negotiate with the second electrical port 41 to obtain an highest supported speed of the second electrical port 41, and the second electrical port and the opposite end establishing a connection at a current speed of the second electrical port;

S2, encapsulating, by an optical port of the first optoelectronic device 2, the current speed of the first optoelectronic device 2 and the negotiated highest supported speed of the first electrical port 11 in transmission parameters of a transmission protocol, and sending the same to the optical port of the second optoelectronic device 3; encapsulating, by the optical port of the second optoelectronic device 3, a current speed of the second optoelectronic device 3 and the negotiated highest supported speed of the second electrical port 41 in the transmission parameters of the transmission protocol, and sending the same to the optical port of the first optoelectronic device 2;

S3, obtaining, by the first optoelectronic device 2 and the second optoelectronic device 3, a target speed based on the highest supported speed of the first electrical port 11 and the highest supported speed of the second electrical port 41, respectively, wherein the target speed is the greatest common divisor of the highest supported speed of the first electrical port 11 and the highest supported speed of the second electrical port 41;

S4, determining whether the current speed of the first optoelectronic device 2 and the current speed of the second optoelectronic device 3 are equal to the target speed, respectively; if the current speeds are equal to the target speed, the current speeds are maintained; if the current speeds are not equal to the target speed, proceed to S5;

S5, configuring, by the first optoelectronic device 2 and the second optoelectronic device 3, the speeds of its electrical port and optical port to the target speed, respectively, and then the first optoelectronic device 2 and the first electrical port 11 negotiating automatically, and the second optoelectronic device 3 and the second electrical port 41 negotiating automatically, to establish a connection.

In particular, in the present invention, the highest supported speed of the opposite end to which a respective electrical port is connected is obtained through the auto-negotiation function of the electrical port. Then the highest supported speed of the respective opposite end connected to the optoelectronic device is sent to the other optoelectronic device through the negotiation of the optical port to which the protocol is configured. The two optoelectronic devices obtain a target speed based on the greatest common divisor of the highest supported speed of the opposite end through negotiation and the highest supported speed, which is transmitted via the protocol, of the opposite end to which the other optoelectronic device is connected. Connections between each of the optoelectronic devices and each of the respective opposite ends and between the two optoelectronic devices are established based on the target speed.

Based on the auto-negotiation function of the electrical ports and the transmission protocol of the optical port on which the optoelectronic devices is arranged, the optical ports can also exchange speed information therebetween through the transmission protocol, and the speed negotiation between the optical ports can be realized by using the above-mentioned technical solution. When the speed of any one of ports changes, it can automatically trigger the negotiation function so that the connections between each of the optoelectronic devices and each of the respective opposite ends and between the two optoelectronic devices can be successfully established.

In a preferred embodiment, in S1, forcing the NP (Next Page) domain in the local Base Page to 1, so that the local can negotiate the Next Page with the opposite end under any circumstances (if the opposite end supports the Next Page to negotiate) to get the highest supported speed of the opposite end.

S1 further comprises:
S11, sending the auto-negotiated Base Page configured with the NP domain to a corresponding opposite end;
S12, judging whether a physical layer of a local electrical port has a gigabit transmission capability;
if yes, send the auto-negotiated Next Page according to the auto-negotiation protocol;
if not, send an empty Next Page.

Furthermore, during the speed matching process, local may reduce speed to adapt to a lower target speed. When the highest speed of any one of the first opposite end and the second opposite end changes so that S1-S5 are repeated, then it is necessary to force the NP bit of the Base Page to 1, otherwise, since the local closes the higher speed, the NP bit of the Base Page will be 0 when local negotiate next time according to the standards 802.3, and Next Page will not be negotiated, so that the highest supported speed of the opposite end cannot be obtained. Therefore, in order to force the opposite end to be able to exchange gigabit transmission speed, when the opposite end itself does not have gigabit transmission speed, it is necessary to configure the message page field corresponding to the description of the NP domain in the auto-negotiated Base Page to 1, and then send the auto-negotiated Base Page which has been configured.

In a preferred embodiment, when the highest supported speed of any one of the first opposite end 1 and the second opposite end 4 changes, the opposite end, of which the highest supported speed changes sends an auto-negotiation request to an optoelectronic device to which it is correspondingly connected, and executes S1-S5.

In particular, in this embodiment, when the first opposite end 1 or the second opposite end 4 is powered on or switched to the highest supported speed so that the speed changes, auto-negotiation between the opposite end and the electrical port of the optoelectronic device to which the opposite end is connected is triggered, the highest supported speed of the opposite end is exchanged to the correspondingly connected optoelectronic device. When the optoelectronic device exchanges negotiation information with the other optoelectronic device through the configured transmission protocol, it will also exchange the highest supported speed, which is changed, of the opposite end to the other optoelectronic device, and then the two optoelectronic devices can re-establish the connections of Link1, Link2, Link3 according to the greatest common divisor of the highest supported speed of the first opposite end 1 and the second opposite end 4. Link1 represents the connection between the first opposite end 1 and the first optoelectronic devices 2, Link 2 represents the connection between the first optoelectronic devices 2 and the second optoelectronic devices 3, and Link 3 represents the connection between the second optoelectronic devices 3 and the second opposite end 4.

Furthermore, in the invention, the number of the optoelectronic devices is not limited, and a plurality of optoelectronic devices can be provided.

In a preferred embodiment, the transmission protocol is SGMII protocol, auto-negotiation is implemented between optical ports of the first optoelectronic device 2 and the second optoelectronic device 3 through the SGMII protocol.

Although the optical transmission standard in the prior art is negotiated, the speed information of the physical layer PHY cannot be negotiated. The present invention configures the optical port to work in the SGMII protocol, so that the optical ports of the two optoelectronic devices can achieve the auto-negotiation of the speed of the physical layer through the SGMII protocol.

The SGMII protocol comprises 16 bits for exchanging links, speed information (speed) of the current physical layer PHY, and duplex (full-duplex, half-duplex) and other negotiation information. In this embodiment, the SGMII protocol is further expanded: configure 2 of the 16 bits and encapsulate the highest supported speed of the opposite end negotiated by the electrical port of the optoelectronic device into the SGMII protocol.

In a preferred embodiment, the first optoelectronic device 2 and the second optoelectronic device 3 comprise a physical layer and an SGMII layer, respectively, and the physical layer is connected to the SGMII Layer and the electrical port of the corresponding opposite end.

S2 further comprises:
outputting, by the physical layer, a trigger signal after receiving the highest supported speed of the negotiated corresponding opposite end;
receiving, by the SGMII layer, the trigger signal, and encapsulating the current speed and the highest supported speed of a corresponding opposite end into transmission parameters of the SGMII protocol;
performing auto-negotiation between the optical port of one of the first optoelectronic device 2 and the second optoelectronic device 3 and the optical port of the other of the first optoelectronic device 2 and the second optoelectronic device 3 through the SGMII protocol.

In particular, in this embodiment, when the electrical port of the first opposite end 1 or of the second opposite end 4 changes, the auto-negotiation is triggered. After receiving the negotiation information, the physical layer of the optoelectronic device obtains the highest supported speed of the opposite end from the negotiation information and triggers the SGMII layer, so that the optical port of the optoelectronic device and the optical port of the other optoelectronic device carry out an SGMII negotiation.

In a preferred embodiment, S3 further comprises:

one of the first optoelectronic device 2 and the second optoelectronic device 3 receiving the transmission protocol sent by the optical port of the other optoelectronic device of the first optoelectronic device 2 and the second optoelectronic device 3, to obtain the highest supported speed of the opposite end corresponding to the other optoelectronic device;

each of the first optoelectronic device 2 and the second optoelectronic device 3 performing the greatest common divisor processing on the highest supported speed of the opposite end of one optoelectronic device and the highest supported speed of the opposite end of the other optoelectronic device to obtain the target speed.

In particular, in this embodiment, the first optoelectronic device 2 receives the SGMII negotiation information of the optical port of the second optoelectronic device 3, and obtains the maximum highest supported speed of the second electrical port 41 of link partner of the electrical port of the second optoelectronic device 3 from 2 of the 16 bits in the SGMII negotiation information, wherein the Link partner of the electrical port of the second optoelectronic device 3 is the second opposite end 4;

similarly, the second optoelectronic device 3 receives the SGMII negotiation information of the optical port of the first optoelectronic device 2, and obtains the maximum highest supported speed of the first electrical port 11 of link partner of the electrical port of the first optoelectronic device 2 from 2 of the 16 bits in the SGMII negotiation information, wherein the Link partner of the electrical port of the first optoelectronic device 2 is the first opposite end 1.

Figure 3:
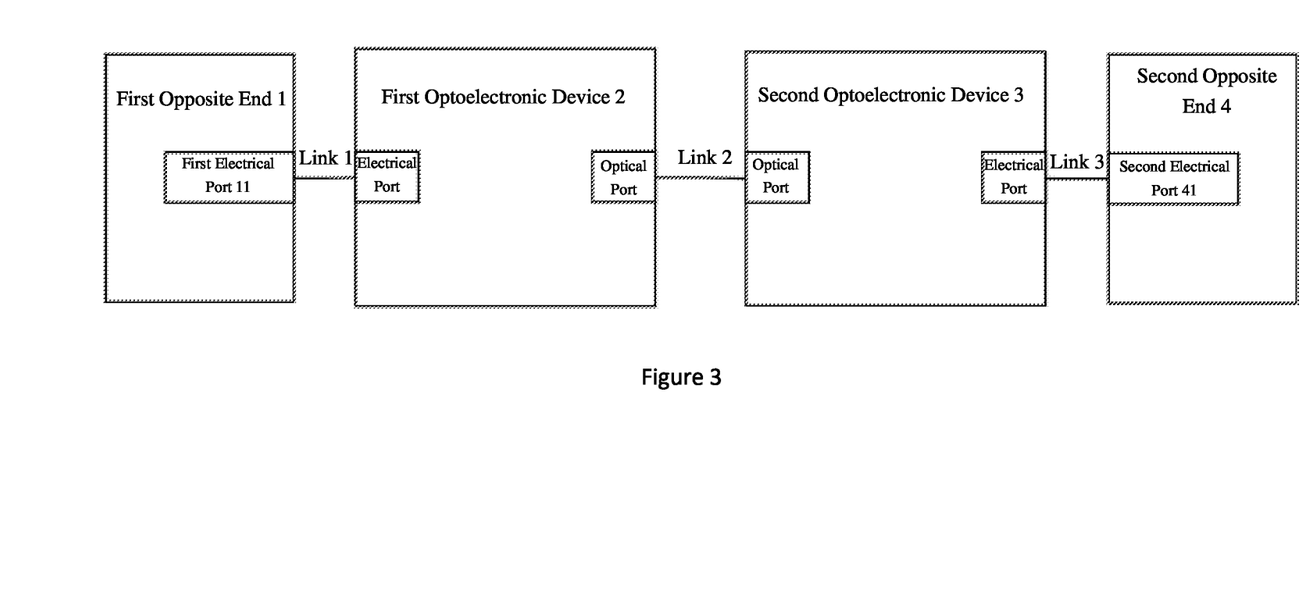
FIG. 3 is a structural block diagram of a specific embodiment of a photoelectric matching system according to the present invention.
Figure 4:
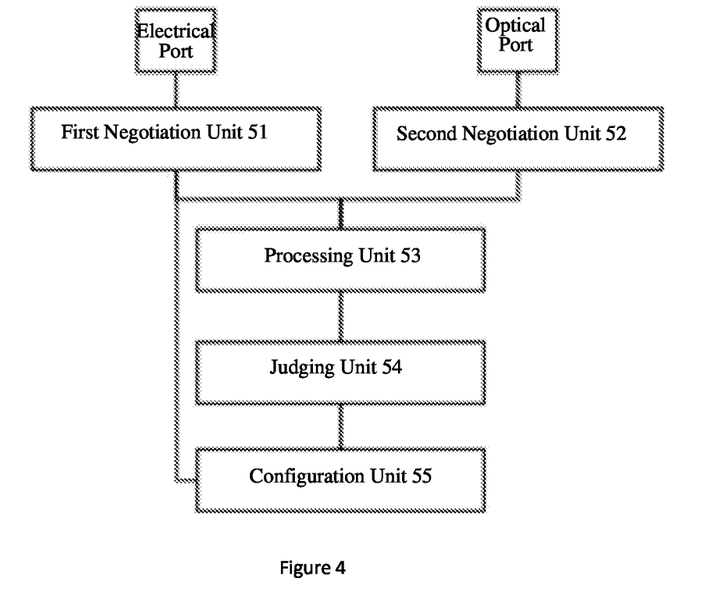
FIG. 4 is a structural block diagram of a specific embodiment of a first optoelectronic device or a second optoelectronic device according to present invention.

The invention further provides an optoelectronic matching system, comprising the above-mentioned optoelectronic matching method, as shown in FIGS. 3-4, the system comprising:

a first optoelectronic device 2, wherein an electrical port of the first optoelectronic device 2 is connected to a first electrical port 11 of a first opposite end 1;

a second optoelectronic device 3, wherein an electrical port of the second optoelectronic device 2 is connected to a second electrical port 41 of a second opposite end 4, and the first optoelectronic device 2 and the second optoelectronic device 3 are connected via optical fibers;

each of the first optoelectronic device 2 and the second optoelectronic device 3 comprises:

a first negotiation unit 51 for auto-negotiation between an electrical port and a corresponding opposite end to obtain the highest supported speed of the opposite end corresponding to each of the optoelectronic devices;

a second negotiation unit 52, connected to the first negotiation unit 51, and configured to encapsulate the current speed and the highest supported speed of the opposite end in transmission parameters of a transmission protocol, and to send the current speed and the highest supported speed of the opposite end to an optical port of the other optoelectronic device;

processing unit 53, connected to the first negotiation unit 51 and the second negotiation unit 52, and configured to obtain a target speed based on the highest supported speed of an opposite end corresponding to one of the optoelectronic devices and the highest supported speed of an opposite end corresponding to the other optoelectronic devices in the transmission protocol;

a judging unit 54, connected to the processing unit 53, and configured to judge whether the current speed is equal to the target speed to obtain a judgment result;

a configuration unit 55, connected to the judgment unit 54 and the first negotiation unit 51, respectively, and configured to configure the speed of the electrical port and the speed of the optical port to the target speed when the judgment result indicates that the current speed of a local electrical port is not equal to the target speed;

wherein the first negotiation unit 51 is further configured to perform auto-negotiation with the corresponding opposite end after the speed is configured to the target speed.

Figure 5:
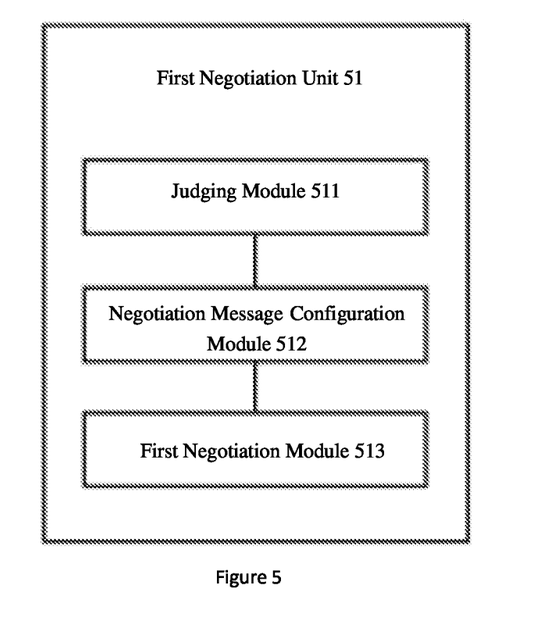
FIG. 5 is a structural block diagram of a specific embodiment of a first negotiation unit according to the present invention.

In a preferred embodiment, as shown in FIG. 5, the first negotiation unit 51 further comprises:

a judging module 511, configured to judge whether the physical layer of the local electrical port has the gigabit transmission capability when sending the auto-negotiated Base Page to a corresponding opposite port;

a negotiation message configuration module 512, connected to the judging module 511, and configured to configure auto-negotiated Next Page according to the auto-negotiation protocol when the physical layer of the local electrical port has gigabit transmission capability; and configured to configure an empty Next Page when the physical layer of the local electrical port does not have gigabit transmission capability; and a first negotiation module 513, connected to the negotiation message configuration module 512, and configured to send the configured auto-negotiated Next Page to a port of the corresponding opposite end.

In a preferred embodiment, the transmission protocol is SGMII protocol, auto-negotiation between optical ports of the first optoelectronic device 2 and the second optoelectronic device 3 is achieved through the SGMII protocol.

In a preferred embodiment, each of the first optoelectronic device 2 and the second optoelectronic device 3 comprises:

a physical layer, connected to an electrical end of a corresponding opposite end, and configured to output a trigger signal after receiving the highest supported speed of negotiated corresponding opposite end;

an SGMII layer, connected to the physical layer, and configured to receive the trigger signal and encapsulate the current speed and the highest supported speed of a corresponding opposite end in transmission parameters of the SGMII protocol, and to perform auto-negotiation between the optical port of one of the first optoelectronic device 2 and the second optoelectronic device 3 and the optical port of the other of the first optoelectronic device 2 and the second optoelectronic device 3 through the SGMII protocol.

The present invention has the beneficial effects that a protocol is configured for an optical port of an optoelectronic device, so that the optical ports can also negotiate the speed therebetween. The highest supported speed of the opposite end to which a respective electrical port is connected can be obtained through the auto-negotiation function of the electrical port. Then the highest supported speed of the respective opposite end connected to the optoelectronic device is sent to the other optoelectronic device through the negotiation of the optical port to which the protocol is configured. The two optoelectronic devices obtain a target speed based on the greatest common divisor of the highest supported speed, which is transmitted via the protocol, of the opposite end to which the other optoelectronic device is connected. Connections between each of the optoelectronic devices and each of the respective opposite ends and between the two optoelectronic devices are established based on the target speed; through the auto-negotiation function, when the speed of any one of the ports changes, it can automatically trigger the negotiation function so that connections between each of the optoelectronic devices and each of the respective opposite ends and between the two optoelectronic devices can be successfully established.

The above descriptions are only the preferred embodiments of the invention, not thus limiting the embodiments and scope of the invention. Those skilled in the art should be able to realize that the schemes obtained from the content of specification and drawings of the invention are within the scope of the invention.

It is claimed:

1. A method for optoelectronic matching, comprising a first optoelectronic device and a second optoelectronic device, wherein the first optoelectronic device is connected to the second optoelectronic device via optical fibers, an electrical port of the first optoelectronic device is connected to a first electrical port of a first opposite end, an electrical port of the second optoelectronic device is connected to a second electrical port of a second opposite end;

the method comprises the steps of:

S1, enabling the electrical port of the first optoelectronic device to auto-negotiate with the first electrical port to obtain an highest supported speed of the first electrical port, and the first electrical port and the opposite end establishing a connection at a current speed of the first electrical port; and enabling an electrical port of the second optoelectronic device to auto-negotiate with the second electrical port to obtain an highest supported speed of the second electrical port, and the second electrical port and the opposite end establishing a connection at a current speed of the second electrical port;

S2, encapsulating, by an optical port of the first optoelectronic device, the current speed of the first optoelectronic device and the negotiated highest supported speed of the first electrical port in transmission parameters of a transmission protocol, and sending the same to the optical port of the second optoelectronic device; encapsulating, by the optical port of the second optoelectronic device, a current speed of the second optoelectronic device and the negotiated highest supported speed of the second electrical port in the transmission parameters of the transmission protocol, and sending the same to the optical port of the first optoelectronic device;

S3, obtaining, by the first optoelectronic device and the second optoelectronic device, a target speed based on the highest supported speed of the first electrical port and the highest supported speed of the second electrical port, respectively, wherein the target speed is the greatest common divisor of the highest supported speed of the first electrical port and the highest supported speed of the second electrical port;

S4, determining whether the current speed of the first optoelectronic device and the current speed of the second optoelectronic device are equal to the target speed, respectively;

if the current speeds are equal to the target speed, the current speeds are maintained;

if the current speeds are not equal to the target speed, proceed to S5;

S5, configuring, by the first optoelectronic device and the second optoelectronic device, the speeds of its electrical port and optical port to the target speed, respectively, and then the first optoelectronic device and the first electrical port negotiating automatically, and the second optoelectronic device and the second electrical port negotiating automatically, to establish a connection.

2. The method for optoelectronic matching of claim 1, further comprising:

forcing the NP (Next Page) domain in the local Base Page to 1, so that the local can negotiate the Next Page with the opposite end under any circumstances to get the highest supported rate of the opposite end;

S1 further comprises:

S11, sending the auto-negotiated Base Page configured with the NP domain to the corresponding opposite end;

S12, judging whether a physical layer of a local electrical port has a gigabit transmission capability;

if yes, send the auto-negotiated Next Page according to the auto-negotiation protocol;

if not, send an empty Next Page.

3. The method for optoelectronic matching of claim 1, wherein when the highest supported speed of any one of the first opposite end and the second opposite end changes, the opposite end, of which the highest supported speed changes, sends an auto-negotiation request to an optoelectronic device to which it is correspondingly connected, and executes S1-S5.

4. The method for optoelectronic matching of claim 1, wherein the transmission protocol is SGMII protocol, auto-negotiation is implemented between optical ports of the first optoelectronic device and the second optoelectronic device through the SGMII protocol.

5. The method for optoelectronic matching of claim 4, wherein the first optoelectronic device and the second optoelectronic device comprise a physical layer and an SGMII layer, respectively, and the physical layer is connected to the SGMII Layer and the corresponding opposite end;

S2 further comprises:

outputting, by the physical layer, a trigger signal after receiving the highest supported speed of the negotiated corresponding opposite end;

receiving, by the SGMII layer, the trigger signal, and encapsulating the current speed and the highest supported speed of a corresponding opposite end into transmission parameters of the SGMII protocol;

performing auto-negotiation between the optical port of one of the first optoelectronic device and the second optoelectronic device and the optical port of the other of the first optoelectronic device and the second optoelectronic device through the SGMII protocol.

6. The method for optoelectronic matching of claim 1, wherein S3 further comprises:

one of the first optoelectronic device and the second optoelectronic device receiving the transmission protocol sent by the optical port of the other optoelectronic device of the first optoelectronic device and the second optoelectronic device, to obtain the highest supported speed of the opposite end corresponding to the other optoelectronic device;

each of the first optoelectronic device and the second optoelectronic device performing the greatest common divisor processing on the highest supported speed of the opposite end of one optoelectronic device and the highest supported speed of the opposite end of the other optoelectronic device to obtain the target speed.

7. An optoelectronic matching system comprising:
a first optoelectronic device, wherein an electrical port of the first optoelectronic device is connected to a first electrical port of a first opposite end;
a second optoelectronic device, wherein an electrical port of the second optoelectronic device is connected to a second electrical port of a second opposite end, and the first optoelectronic device and the second optoelectronic device are connected via optical fibers;
each of the first optoelectronic device and the second optoelectronic device comprises: a first negotiation unit for auto-negotiation between an electrical port and a corresponding opposite end to obtain the highest supported speed of the opposite end corresponding to each of the optoelectronic devices;
a second negotiation unit, connected to the first negotiation unit, and configured to encapsulate the current speed and the highest supported speed of the opposite end into transmission parameters of a transmission protocol, and to send the current speed and the highest supported speed of the opposite end to an optical port of the other optoelectronic device;
a processing unit for obtaining a target speed based on the highest supported speed of an opposite end corresponding to one of the optoelectronic devices and the highest supported speed of an opposite end corresponding to the other optoelectronic device in the transmission protocol; a judging unit, connected to the processing unit, and configured to judge whether the current speed is equal to the target speed to obtain a judgment result;
a configuration unit, connected to the judgment unit and the first negotiation unit, respectively, and configured to configure the speed of the electrical port and the speed of the optical port to the target speed when the judgment result indicates that the current speed of a local electrical port is not equal to the target speed;
wherein the first negotiation unit is further configured to perform auto-negotiation with the corresponding opposite end after the speed is configured to the target speed.

8. The optoelectronic matching system of claim 7, wherein the first negotiation unit further comprises:
a judging module, configured to judge whether the physical layer of the local electrical port has the gigabit transmission capability when sending the auto-negotiated Base Page to a corresponding opposite port;
a negotiation message configuration module, connected to the judging module, and configured to configure auto-negotiated Next Page according to the auto-negotiation protocol when the physical layer of the local electrical port has gigabit transmission capability; and configured to configure an empty Next Page when the physical layer of the local electrical port does not have gigabit transmission capability; and
a first negotiation module, connected to the negotiation message configuration module, and configured to send the configured auto-negotiated Next Page to a port of the corresponding opposite end.

9. The optoelectronic matching system of claim 7, wherein the transmission protocol is SGMII protocol, auto-negotiation between optical ports of the first optoelectronic device and the second optoelectronic device is achieved through the SGMII protocol.

10. The optoelectronic matching system of claim 9, wherein each of the first optoelectronic device and the second optoelectronic device comprises:
a physical layer, connected to an electrical end of a corresponding opposite end, and configured to output a trigger signal after receiving the highest supported speed of negotiated corresponding opposite end;
an SGMII layer, connected to the physical layer, and configured to receive the trigger signal, and configured to encapsulate the current speed and the highest supported speed of a corresponding opposite end into transmission parameters of the SGMII protocol, and to perform auto-negotiation between the optical port of one of the first optoelectronic device and the second optoelectronic device and the optical port of the other of the first optoelectronic device and the second optoelectronic device through the SGMII protocol.

* * * * *